(12) United States Patent
Heinrich et al.

(10) Patent No.: US 12,104,679 B2
(45) Date of Patent: Oct. 1, 2024

(54) BALL SCREW DRIVE AND METHOD FOR OPERATING A BALL SCREW DRIVE

(71) Applicant: Schaeffler Technologies AG & Co. KG, Herzogenaurach (DE)

(72) Inventors: Nicky Heinrich, Neustadt a. d. Aisch (DE); Sedat Oezdemir, Herzogenaurach (DE); Robert Drechsler, Veitsbronn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 3 days.

(21) Appl. No.: 18/014,526

(22) PCT Filed: Jun. 8, 2021

(86) PCT No.: PCT/DE2021/100489
§ 371 (c)(1),
(2) Date: Jan. 5, 2023

(87) PCT Pub. No.: WO2022/007988
PCT Pub. Date: Jan. 13, 2022

(65) Prior Publication Data
US 2023/0258249 A1 Aug. 17, 2023

(30) Foreign Application Priority Data
Jul. 10, 2020 (DE) .................. 10 2020 118 230.9

(51) Int. Cl.
*F16H 25/22* (2006.01)
*F16D 65/14* (2006.01)
*F16D 125/40* (2012.01)

(52) U.S. Cl.
CPC ......... *F16H 25/2238* (2013.01); *F16D 65/14* (2013.01); *F16H 25/2209* (2013.01); *F16D 2125/40* (2013.01)

(58) Field of Classification Search
CPC ............. F16H 25/2238; F16H 25/2209; F16H 25/2204
See application file for complete search history.

(56) References Cited

U.S. PATENT DOCUMENTS

| | | | | |
|---|---|---|---|---|
| 5,782,135 A * | 7/1998 | Kondo | ................ | F16C 33/6696 74/89.44 |
| 6,499,374 B1 * | 12/2002 | Ohga | ...................... | F16C 19/20 74/424.82 |
| 7,493,837 B2 * | 2/2009 | Wu | ......................... | F16C 33/37 384/522 |

(Continued)

FOREIGN PATENT DOCUMENTS

| | | |
|---|---|---|
| DE | 4235842 A1 | 4/1994 |
| DE | 102007049832 A1 | 4/2009 |

(Continued)

*Primary Examiner* — Jake Cook

(57) ABSTRACT

A ball screw drive, in particular for a parking brake, comprises a threaded spindle, a spindle nut, and rolling bodies, namely balls, which are arranged in a thread turn between the threaded spindle and the spindle nut. Spring elements are arranged in the thread turn between nut-side stops. There is at least one setting of the threaded spindle and the spindle nut in which the balls and the spring elements are arranged in the thread turn with backlash.

20 Claims, 1 Drawing Sheet

(56) References Cited

U.S. PATENT DOCUMENTS

| | | | |
|---|---|---|---|
| 8,684,147 B2* | 4/2014 | Winkler | F16H 25/2238 |
| | | | 188/72.8 |
| 2003/0106386 A1* | 6/2003 | Pacieri | F16C 33/3713 |
| | | | 74/424.82 |
| 2018/0283510 A1* | 10/2018 | Tashiro | F16D 65/18 |

FOREIGN PATENT DOCUMENTS

| | | |
|---|---|---|
| DE | 102010051268 A1 | 5/2012 |
| DE | 102014223021 A1 | 5/2016 |
| DE | 102018107092 A1 | 10/2018 |
| DE | 102017127404 B4 | 1/2020 |
| EP | 2207982 B1 | 3/2011 |
| WO | 2004013503 A1 | 2/2004 |

* cited by examiner

BALL SCREW DRIVE AND METHOD FOR OPERATING A BALL SCREW DRIVE

CROSS-REFERENCE TO RELATED APPLICATIONS

This application is the U.S. National Phase of PCT Application No. PCT/DE2021/100489 filed on Jun. 8, 2021, which claims priority to DE 10 2020 118 230.9 filed on Jul. 10, 2020, the entire disclosures of which are incorporated by reference herein.

TECHNICAL FIELD

The disclosure relates to a ball screw drive suitable for use in an electromechanical actuator. Furthermore, the disclosure relates to a method for operating a ball screw drive.

BACKGROUND

A generic ball screw drive intended for operation in an electromechanically actuatable parking brake of a motor vehicle is known, for example, from EP 2 207 982 B1. The known ball screw drive has balls as rolling bodies, which are arranged in a thread turn of the ball screw drive so that they can move to a limited extent. Here, a spring element in the form of a helical spring is arranged between a stop and the rolling bodies. In addition, at least one intermediate spring element is provided, which is arranged between rolling bodies and is designed either as a helical compression spring or as an elastomer spring. If there are several intermediate spring elements, they are evenly distributed between the rolling bodies in order to reduce frictional forces between the rolling bodies.

Another ball screw drive is described in DE 10 2014 223 021 A1. In contrast to the ball screw drive according to the cited patent specification EP 2 207 982 B1, in this case, which also relates to a floating caliper disk brake, rigid separating bodies are provided instead of intermediate spring elements. The frictional force between the balls of the ball screw drive is reduced with the aid of the separating bodies. DE 10 2014 223 021 A1 mentions non-elastic plastic as the material from which the separating bodies can be produced. The separating bodies can be separating balls whose diameter is smaller than the diameter of the balls acting as rolling bodies.

A ball screw drive which has spring elements which are inserted into a thread turn and apply a force to the balls of the screw drive is also described in DE 10 2017 127 404 B4. In this case, a stop for a spring element is formed by a molded part which is connected to the threaded nut of the ball screw drive.

SUMMARY

The disclosure is based on the object of further developing a ball screw drive that is suitable for a parking brake of a motor vehicle, among other things, compared to the prior art mentioned, in such a way that there is a particularly favorable ratio between production costs, required installation space and friction occurring during operation of the ball screw drive.

This object is achieved according to a ball screw drive with the features described herein. The object is also achieved by a method described herein for operating a ball screw drive. Embodiments and advantages of the disclosure explained below in relation to the operating method also apply to the device, i.e. the ball screw drive, and vice versa.

In a basic structure known per se, the ball screw drive comprises a threaded spindle, a spindle nut, and rolling bodies, namely balls, which are arranged in a thread turn between the threaded spindle and the spindle nut, wherein, furthermore, spring elements are arranged in the thread turn between stops on the nut side. Either the threaded spindle or the spindle nut, which has the stops for the two spring elements or is firmly connected to such stops, can be provided as the rotating drive element of the ball screw drive, while the other component of the screw drive, i.e. the spindle nut or the threaded spindle, acts as a movable output element, which is secured against torsion, of the ball screw drive.

In principle, it is also possible to drive the ball screw drive via linear displacement of one of the components mentioned, wherein the output element of the screw drive is a rotating element in such a case, i.e. a linear-rotary transmission is formed. Irrespective of which component of the ball screw is the drive component, the thread of the ball screw can in principle be designed either as a single-start thread or as a multi-start thread.

According to an embodiment, there is at least one setting of the ball screw, that is, a positioning of the spindle nut relative to the threaded spindle, in which the rolling bodies and the spring elements are arranged in the thread turn with backlash. The backlash can occur between different elements of the ball screw, in particular between individual rolling bodies and/or between a spring element and a rolling body. At the same time, backlash can be present at one, two, or more points within the ball-spring strand formed between the two stops, which is also referred to as a ball-spring package or, for simplification, as a ball chain.

The ball screw drive can be operated in that, starting from a first position in which exactly one of the two spring elements is tensioned, i.e. compressed, it is first brought into a central position in which both spring elements are relaxed and, accordingly, the balls are arranged in the thread turn with backlash. The term "central position" does not necessarily mean that this position is exactly in the center between two stop positions. Rather, the central position can also be located eccentrically between two stop positions. In any case, the ball screw drive can be brought from the central position into a second setting in which, in contrast to the first setting, the second spring element is tensioned and the first spring element is relaxed.

Due to the backlash-prone arrangement of the balls in the thread turn, slippage of the balls can occur in the central section of the adjustment range of the ball screw, which is accepted. On the other hand, towards the end of the adjustment range, with increasing forces, the balls roll off with practically no slippage. A ball return with a ring-shaped closed ball channel does not exist. The ball screw drive is therefore designed for applications with short adjustment paths, such as are typical for electromechanical parking brakes. In this application, the balls, which are spring-loaded depending on the operating state, roll off in the thread turn both when clamping and releasing the brake, whereby a hydraulic preload can be present at the same time.

The rolling bodies of the ball screw drive can be combined into several groups, wherein one spacer element each is arranged between individual groups. Balls, i.e. separating balls, which are smaller than the rolling bodies, i.e. bearing balls, of the ball screw drive are particularly suitable as spacer elements. For example, the diameter of each separating ball, i.e. spacer ball, is at least 80% and at most 95% of the diameter of each bearing ball of the screw drive.

As far as the choice of material is concerned, the spacer elements can be made either from the same material as the rolling bodies or from a different material, for example from a metallic material with a different composition and/or that has been heat-treated in a different way, or even from a plastic material. In typical applications, the rolling bodies of the ball screw drive are metallic rolling bodies. In principle, the use of ceramic rolling bodies can also be considered.

Irrespective of the materials from which the rolling bodies and the spacer elements are made, for example, groups of rolling bodies which are each formed from at least two and a maximum of four rolling bodies are each separated from one another by a spacer element, in particular a spacer ball.

For example, the group of rolling bodies adjacent to the first spring element includes exactly three rolling bodies, while the group of rolling bodies adjacent to the second spring element includes exactly two rolling bodies, wherein at least one spacer element is arranged between these outermost groups of rolling bodies, typically a plurality of spacer elements, in particular separating balls. The first spring element is also referred to as an adjustment spring, and the second spring element is also referred to as a pre-compression spring. Both spring elements are typically designed as helical compression springs. According to possible embodiments, the first spring element—measured in the direction of the extension of the thread turn—is longer than the second spring element.

In total, at least twelve and at most 30 groups of rolling bodies are arranged between the pre-compression spring and the readjusting spring, wherein each of these groups of rolling bodies comprise no more than four bearing balls.

The total length of the free space measured in the direction of the extension of the thread turn and not necessarily formed at just one point, which is equivalent to the existing backlash in the ball-spring assembly, is, when the spring elements are relaxed, for example, at least 0.2% and at most 5% of the total length of the thread turn to be measured between the two stops on the nut side.

The advantage of the disclosure lies in particular in the fact that in a ball screw drive without ball return due to backlash in the ball-spring package, compared to conventional screw drives with preload in the ball-spring strand, a particularly high degree of efficiency can be achieved without additional equipment expenditure, wherein this creates no practically relevant disadvantages, such as in terms of wear behavior or acoustic behavior.

BRIEF DESCRIPTION OF THE DRAWINGS

In the following, an exemplary embodiment of the disclosure is explained in more detail by means of a drawing. In the drawings.

DETAILED DESCRIPTION

Figure 1:
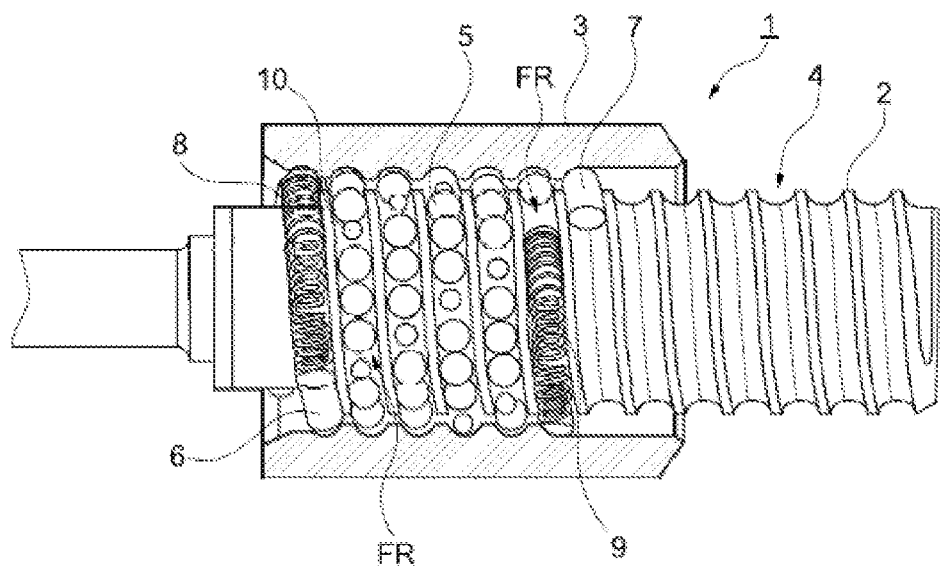
FIG. 1 shows a ball screw drive in a sectional representation.

A ball screw drive, identified overall by the reference numeral 1, is intended for use as a rotary-linear transmission in a parking brake of a motor vehicle and comprises a threaded spindle 2 and a threaded nut 3. A thread turn of the ball screw drive 1 is identified by the numeral 4. Between the threaded spindle 2 and the threaded nut 3, balls roll off as rolling bodies 5 in the thread turn 4. With regard to the principal function of the ball screw drive 1, reference is made to the prior art cited at the outset. The parking brake of the motor vehicle is combined with a hydraulic disc brake in a manner known per se.

In the threaded nut 3, which is also referred to as a spindle nut, there is a first nut-side stop 6 and a second nut-side stop 7. A rolling body return, for example in the form of an external deflection, is not provided. Therefore, using the ball screw 1 for applications with long travel distances is out of the question.

In the thread turn 4 there is a first spring element 8 which can strike the first stop 6 and a second spring element 9 which can be supported on the second stop 7. Both spring elements 8, 9 are designed as helical springs.

In addition to the rolling bodies 5, i.e. bearing balls, there are several spacer elements 10 in the thread turn 4. The spacer elements 10 are balls which have a smaller diameter than the rolling bodies 5. As far as the arrangement of the various balls 5, 10 in the thread turn 4 is concerned, reference is made to the symbolized representation according to FIG. 2. Immediately following the first spring element 8, i.e. the adjustment spring, which is significantly longer than the pre-compression spring 9, there is a ball arrangement 11 in the arrangement shown, which is constructed in a defined manner from groups of rolling bodies 5 and spacer elements 10: Alternating groups of three rolling bodies 5 and individual spacer elements 10 are inserted into the thread turn 4. Overall, the ball arrangement 11, only partially shown, is made up of 19 groups of three rolling bodies 5 each, that is to say a total of 57 rolling bodies 5 and an additional 19 spacer balls 10. This ball arrangement 11 is followed by a closing ball arrangement 12 which is formed from only two rolling bodies 5. In the exemplary embodiment, the rolling bodies 5 of both the ball arrangement 11 and the closing ball arrangement 12 have a diameter of 2.778 mm and the spacer elements 10 have a diameter of 2.5 mm. The difference in size between the rolling bodies 5 and the spacer balls 10 is exaggerated in both figures. The purpose of the spacer balls 10 is to reduce the friction within the ball screw drive 1 compared to screw drives, which only have balls of the same size.

As can be seen from the two figures, a free space FR is formed in the thread turn 4 as a further measure to reduce friction and thus to increase the efficiency. This is equivalent to the fact that the rolling bodies 5 and spacer elements 10 are arranged in the thread turn 4 with backlash even in the completely relaxed state of both spring elements 8, 9, wherein the backlash relates to the direction in which the thread turn 4 extends. The total length of the free space FR to be measured in the specified direction, which can be divided into sections, i.e. in the form of individual free sections, is at least 0.2% and at most 5% of the total length of the thread turn 4. As soon as one of the two spring elements 8, 9 is tensioned while the other spring element 9, 8 remains fully expanded, the free space FR increases.

Figure 2:
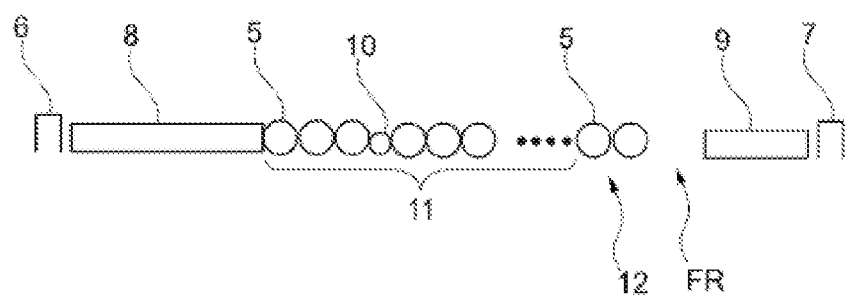
FIG. 2 shows components of the ball screw according to FIG. 1 in an abstracted representation.

In the arrangement according to FIG. 2, the free space FR between the closing ball arrangement 12 and the pre-compression spring 9 is shown—not to scale. If, starting from this arrangement, the threaded nut 3 is adjusted to the left relative to the threaded spindle 2, this means that the free space FR indicated in FIG. 2 becomes smaller, while both spring elements 8, 9 are relaxed and an additional free space FR is created between the first spring element 8 and/or—as indicated in FIG. 1—within the ball arrangement 11. In this state, the rolling bodies 8 are therefore not under spring preload. In a load-free or low-load state, this can lead to rolling bodies 5 slipping. If, on the other hand, the rolling bodies 5 are displaced against one of the spring elements 8, 9 as the forces within the ball screw drive 1 increase, wherein either the first spring element 8 contacts the ball arrangement 11 or the second spring element 9 presses against the closing ball arrangement 12, the forces that occur, including the spring forces, ensure a kinematically almost ideal rolling of the rolling bodies 5. Under conditions of high load, the behavior of the ball screw drive 1 thus hardly deviates from the behavior of a conventional roller screw drive with permanent spring preloading of the rolling bodies, whereas particularly in a central adjustment range, low-friction adjustment of the ball screw 1 is possible and thus a particularly high efficiency is achieved overall.

LIST OF REFERENCE SYMBOLS

1 Ball screw drive
 2 Threaded spindle
 3 Threaded nut
 4 Thread turn of the threaded spindle
 5 Rolling body, ball
 6 First nut-side stop
 7 Second nut-side stop
 8 First spring element
 9 Second spring element
 10 Spacer element, ball
 11 Ball arrangement
 12 Closing ball arrangement
 FR Free space

The invention claimed is:

1. A ball screw drive, comprising:
 a threaded spindle,
 a spindle nut,
 rolling bodies configured as balls arranged in a thread turn between the threaded spindle and the spindle nut, and
 a first spring element arranged in the thread turn between two nut-side stops,
 wherein in at least one setting of the threaded spindle and the spindle nut, the balls and the first spring element are arranged in the thread turn with backlash.

2. The ball screw drive according to claim 1, further comprising spacer elements arranged between a plurality of groups of balls.

3. The ball screw drive according to claim 2, wherein the spacer elements are configured as balls which are smaller than the rolling bodies.

4. The ball screw drive according to claim 3, wherein a diameter of each spacer element is at least 80% and at most 95% of a diameter of each rolling body.

5. The ball screw drive according to claim 2, wherein groups of at least two and at most four rolling bodies are each separated from one another by a spacer element.

6. The ball screw drive according to claim 5, further comprising a second spring element arranged in the thread turn between two nut-side stops, and a first group of rolling bodies adjacent to the first spring element comprises exactly three rolling bodies and a second group of rolling bodies adjacent to the second spring element comprises exactly two rolling bodies, and at least one spacer element is arranged between the first and second groups of rolling bodies.

7. The ball screw drive according to claim 6, wherein the first spring element, measured in a direction of an extension of the thread turn, is longer than the second spring element.

8. The ball screw drive according to claim 7, wherein a total of at least twelve and at most thirty groups of rolling bodies are arranged between the first and second spring elements.

9. The ball screw drive according to claim 1, further comprising a second spring element, and a total length of a free space measured in a direction of an extension of the thread turn when the first and second spring elements are relaxed is at least 0.2% and at most 5% of a total length of the thread turn to be measured between the two nut-side stops.

10. A method for operating a ball screw drive, comprising:
 arranging balls as rolling bodies in a thread turn formed between a threaded spindle and a spindle nut,
 arranging first and second spring elements in said thread turn, such that starting from a first setting of the ball screw drive, in which the first spring element is tensioned, the ball screw drive via a central position of the threaded spindle and the spindle nut, in which the first and second spring elements are relaxed, is brought out into a second setting, in which the second spring element is tensioned.

11. The method of claim 10, wherein in the second setting, the first spring element is relaxed.

12. A ball screw drive, comprising:
 a threaded spindle,
 a spindle nut,
 a first quantity of rolling bodies arranged in a thread turn between the threaded spindle and the spindle nut, and
 a first spring element and a second spring element arranged in the thread turn between two end stops, and
 in at least one setting of the threaded spindle and the spindle nut, the first quantity of rolling bodies and the first and second spring elements are arranged in the thread turn with backlash.

13. The ball screw drive of claim 12, wherein the first and second spring elements are helical springs.

14. The ball screw drive of claim 12, further comprising a first quantity of spacer elements arranged amongst the first quantity of rolling bodies.

15. The ball screw drive of claim 14, wherein the first quantity of rolling bodies are balls and the first quantity of spacer elements are balls which are smaller than the first quantity of rolling bodies.

16. The ball screw drive of claim 15, wherein the first quantity of rolling bodies are arranged in groups of consecutive same-sized balls and at least one ball of the first quantity of spacer elements are arranged between the groups.

17. The ball screw drive of claim 16, further comprising:
 a central setting in which the first and second spring elements are in a relaxed state and backlash is present between the first quantity of rolling bodies,
 a first setting of the ball screw drive in which the first spring element is tensioned, and
 a second setting of the ball screw drive in which the second spring element is tensioned.

18. The ball screw drive of claim 17, wherein the groups of consecutive same-sized balls include a first group having at least two balls, and one of the at least two balls is configured to abut with a first end stop, and another one of the at least two balls is configured to abut with one ball of the first quantity of spacer elements.

19. The ball screw drive of claim 1, wherein in the at least one setting of the threaded spindle and the spindle nut, the first spring element is in a relaxed state.

20. The ball screw drive of claim 16, further comprising:
a central setting in which the first and second spring elements are in a relaxed state and the first and second spring elements and the first quantity of rolling bodies are arranged in the thread turn with backlash, and
a first setting of the threaded spindle and the spindle nut in which the first spring element is tensioned.

\* \* \* \* \*